United States Patent [19]

Ingram

[11] 4,123,744
[45] Oct. 31, 1978

[54] METHOD AND APPARATUS FOR DYNAMICALLY INVESTIGATING A BOREHOLE

[75] Inventor: John D. Ingram, Meudon, France

[73] Assignee: Schlumberger Technology Corporation, New York, N.Y.

[21] Appl. No.: 776,336

[22] Filed: Mar. 10, 1977

[51] Int. Cl.² ............................................. G01V 1/40
[52] U.S. Cl. ................... 340/15.5 TN; 340/15.5 BH; 340/17 R; 181/104
[58] Field of Search ................ 181/104; 340/15.5 BH, 340/15.5 TN, 15.5 MC, 15.5 CP, 17

[56] References Cited

U.S. PATENT DOCUMENTS

| | | | |
|---|---|---|---|
| 3,346,068 | 10/1967 | Woods et al. | 340/15.5 CP |
| 3,496,533 | 2/1970 | Semmelink | 340/17 |
| 3,614,725 | 10/1971 | Moran | 340/17 |
| 3,732,945 | 5/1973 | Lavigne | 340/17 |
| 3,916,371 | 10/1975 | Broding | 340/15.5 MC |
| 3,961,307 | 6/1976 | Hochheimer et al. | 340/15.5 CP |

Primary Examiner—Howard A. Birmiel
Attorney, Agent, or Firm—Louis H. Reens; Bruce N. Carpenter

[57] ABSTRACT

An apparatus and method for investigating a borehole with energy transmissions whose directivity is varied in real time during the investigation is described. A plurality of transmitters are employed on a well logging tool with at least one receiver located ahead of the transmitters. The transmitters are repetitively activated to transmit a wave of energy to the receiver which produces a received wave. A parameter of the received wave is derived and used to vary the relative delay of activation of the transmitters to direct the beam of energy in a manner whereby the parameter is effectively enhanced for a subsequent investigation. A real time control is provided over the directivity of the energy transmissions to preferentially emphasize a particular segment of a received wave. An acoustic borehole investigation is described with which the detection of the travel time of a compressional wave or the peak value of a predetermined half cycle are optimized by controlling the directivity of the acoustic transmissions in real time.

25 Claims, 4 Drawing Figures

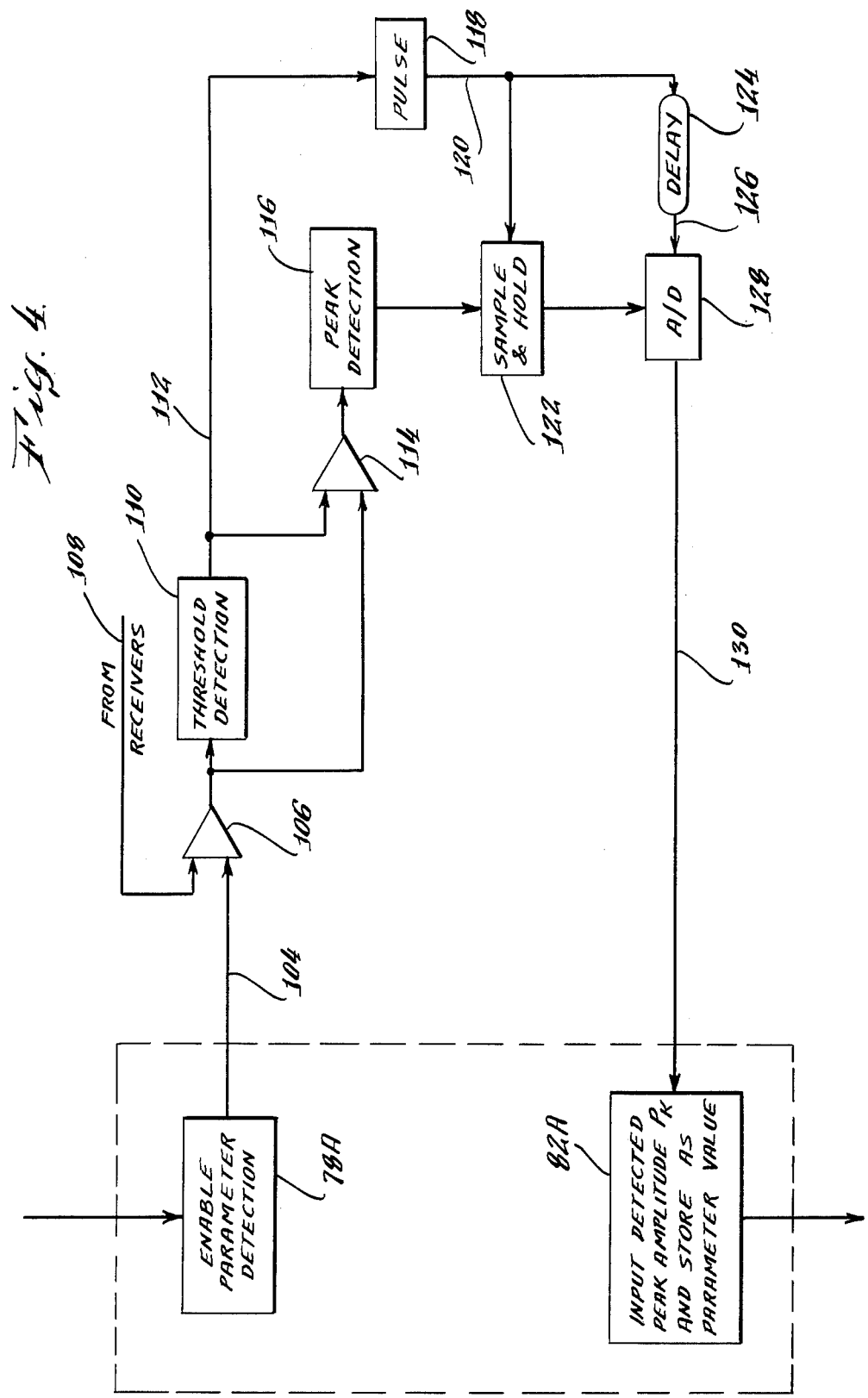

METHOD AND APPARATUS FOR DYNAMICALLY INVESTIGATING A BOREHOLE

FIELD OF THE INVENTION

This invention relates to a well logging method and apparatus wherein the directivity of energy transmissions is adjusted during the investigation of a borehole. More specifically, this invention relates to a method and apparatus for dynamically steering acoustic transmitters during the investigation of the borehole.

BACKGROUND OF THE INVENTION

Acoustic well logging methods and systems have been extensively described in the art. In a typical system an acoustic transmitter is located above a pair of sonic receivers on a well logging tool. As the tool is pulled upwardly, the transmitter is actuated to direct acoustic energy into the borehole. As a result of the transmitter's cylindrical shape, most of its energy is directed normal to its axis and radially outward towards the surrounding earth formation where it subsequently travels both upward and downward along the borehole wall as well as outward in the formation. The receivers, located below the transmitter, utilize only the part of the energy traveling downward along the borehole and through the formation. The energy traveling upward and outward is, consequently, not utilized. This inefficient energy use limits spacing allowable between the transmitter and receivers. Energy received by a receiver located too far from a transmitter would be too low to allow reliable processing of received waves to derive information such as the travel time of a particular wave, or the magnitude of the wave, or such other parameter which leads to an understanding of the earth formation around the borehole as a function of depth.

The magnitude of the waveforms incident upon the receivers is a function of a large number of factors such as attenuation of the waveforms due to the transmitter to receiver spacing, the character of the formation, the dominant frequency spectrum of the acoustic energy, borehole shape and size. Also, formations may be acoustically altered near the borehole such that signals from receivers located at short transmitter-to-receiver spacings do not represent the radially deeper unaltered formation characteristics. To make accurate measurements under such conditions requires longer spacings and stronger signals at these distant receivers. In light of the variable nature of the earth formation, the magnitude of the acoustic energy incident upon the receivers frequently tends to be marginal.

Proposals have been made to improve the magnitude of the acoustic waves traveling downward toward the receivers by controlling the directivity of the energy distribution from the transmitter. One technique, such as illustrated in U.S. Pat. No. 3,136,318 issued to Anderson on June 9, 1964, alters the directivity pattern in a fixed manner. In other techniques the directivity pattern may be mechanically adjusted, as described in U.S. Pat. No. 3,542,150 issued to Youmans; or electrically adjusted such as by the technique described in U.S. Pat. No. 3,496,553 issued to Semmelink. These adjustments are usually made prior to running the borehole tool into the borehole to perform the logging and are consequently based upon estimated logging conditions. The electrically adjustable techniques usually employ a technique known as beam steering, involving a delayed firing of the transmitters so that the overall energy pattern has a peak in a particular direction.

As described in the Semmelink patent, a transmitter is formed of a plurality of separate elemental generators which are closely spaced from each other along the axis of the borehole tool. These generators are electrically connected in series through electrical delay lines. When the transmitter is fired, the uppermost generator is pulsed first with the pulsing of each lower generator delayed relative to the one above it. Delays are such that the pulsing of each element generates an acoustical wave which is in phase with the previously generated waves traveling downward. This phase delayed pulsing generates an overall acoustical pulse whose energy distribution is particularly enhanced in a direction from the first toward the last pulsed element of the transmitter. This directivity changes both with the physical distance between the elements and the internal delay. The physical distance is set on an assembly of the transmitter. The electrical delay could be changed in the field by changing the charging voltage or capacitors used in the electrical circuits.

In U.S. Pat. No. 3,732,945 to Lavigne, a transmitter arrangement is described whereby the directivity of energy can be changed by phase delaying the firing times of a plurality of transmitters. The delay times are fixed under control of a signal set at the surface. By setting the control signal for different delays, specific waves, such as the compressional or shear wave, in the acoustic wave arriving at the sonic receivers, can be emphasized by controlling the directivity of the acoustic energy at the transmitters.

Still another sonic well logging technique using electrically selectable beam steering is described in U.S. Pat. No. 3,614,725 to Moran. As described in this patent, the downward directivity angle of an acoustic transmitter beam may be varied remotely such as from the earth surface by setting a magnetic bias on permeable cores interconnecting separate transmitter elements.

Other well logging techniques using beam steering at a set angle or resettable angle have been described, such as found in the U.S. Pat. No. 3,475,722.

The well logging technique using beam steering as it is described in the above prior art does not provide for an adjustment to frequent variation as may be encountered by a well logging tool when it traverses different formations. In fact, a common practice with well logging techniques having a beam steering capability is to select a fixed beam angle based upon best estimates of the formation characteristics rather than actual measurements and maintaining this fixed angle through a single well logging pass. Though such technique can be a useful application of beam steering, the well logging results may not utilize the optimum potential of beam steering. Further, the relative physical position of the transmitter and receivers in the prior art was not suitable in normal operations to allow proper use of actual measurements to make steering adjustments.

SUMMARY OF THE INVENTION

In a well logging technique in accordance with the invention, a dynamic beam steering technique is employed. A wave parameter is derived as a logging tool is moved along the borehole. The parameter is then utilized to dynamically adjust the steering of a wave to optimize the derived parameter. The directivity pattern of transmitters located on the tool is automatically adjusted in accordance with the parameter as the tool is moved along the borehole.

The terms "dynamic steering" or "dynamic beam steering" employed herein, means the real-time variation of the directivity of the energy transmission from the transmitters as a function of a parameter derived from a previously transmitted wave to enhance the wave segment from which the parameter is derived. With a well logging technique in accordance with the invention, the direction of the energy from the transmitters is optimized as a borehole investigation is conducted.

In one form of dynamic beam steering, a particular parameter of a received wave is preferentially emphasized by controlling the directivity of the transmitters' beam of energy as a measurement of the parameter.

In another embodiment, the parameter is derived at a borehole location ahead of the transmitters and temporarily stored until the transmitters are moved to this borehole location. The derived parameter is then utilized to adjust the directivity pattern of the transmitters in accordance with the value of the parameter of that location. As a result, the wave segment from which the parameter is derived is enhanced.

As described with reference to one technique for dynamic steering in accordance with the invention, a well logging tool carrying a plurality of spaced transmitters and receivers is moved upwardly along a borehole. The upper and lower transmitters are both placed below the receivers. The transmitters are then activated successively with an initial relative delay selected to produce a transmitted wave with its energy distribution enhanced in the upward direction and at an angle optimum for exciting the transmission of the wave through the formation towards the receivers. Signals from the receivers are promptly processed to derive a particular parameter such as the travel time of the transmitted wave through the earth formation between the receivers. When the transmitters are moved opposite the formation for which the parameter was derived, the time between the transmitter actuations is varied to emphasize the transmitted wave by, for example, delaying actuation of the upper transmitter relative to the lower transmitter as a function of the derived travel time.

When the spacing between a pair of receivers used to derive the parameter, differs from the spacing between the transmitters, the activation delay is further corrected for this difference.

The dynamic beam steering can be controlled in accordance with different parameters. For example, a predetermined received wave characteristic can be isolated and preferentially enhanced by controlling the relative phasing between the transmitters which may produce acoustic or electromagnetic energy beams. In a sonic borehole investigation, the parameter employed in dynamic steering may be, for example, the travel time of the compressional or shear waves.

It is, therefore, an object of the invention to provide a method and apparatus for dynamically steering the energy transmissions produced by transmitters employed in the investigation of a borehole.

These and other advantages and objects of the invention can be understood from the following description of several embodiments described in conjunction with the drawings.

BRIEF DESCRIPTION OF DRAWINGS

FIG. 4 is a schematic representation to an analog technique for deriving a parameter to be preferentially enhanced by dynamic steering.

DETAILED DESCRIPTION OF EMBODIMENTS

Figure 1:
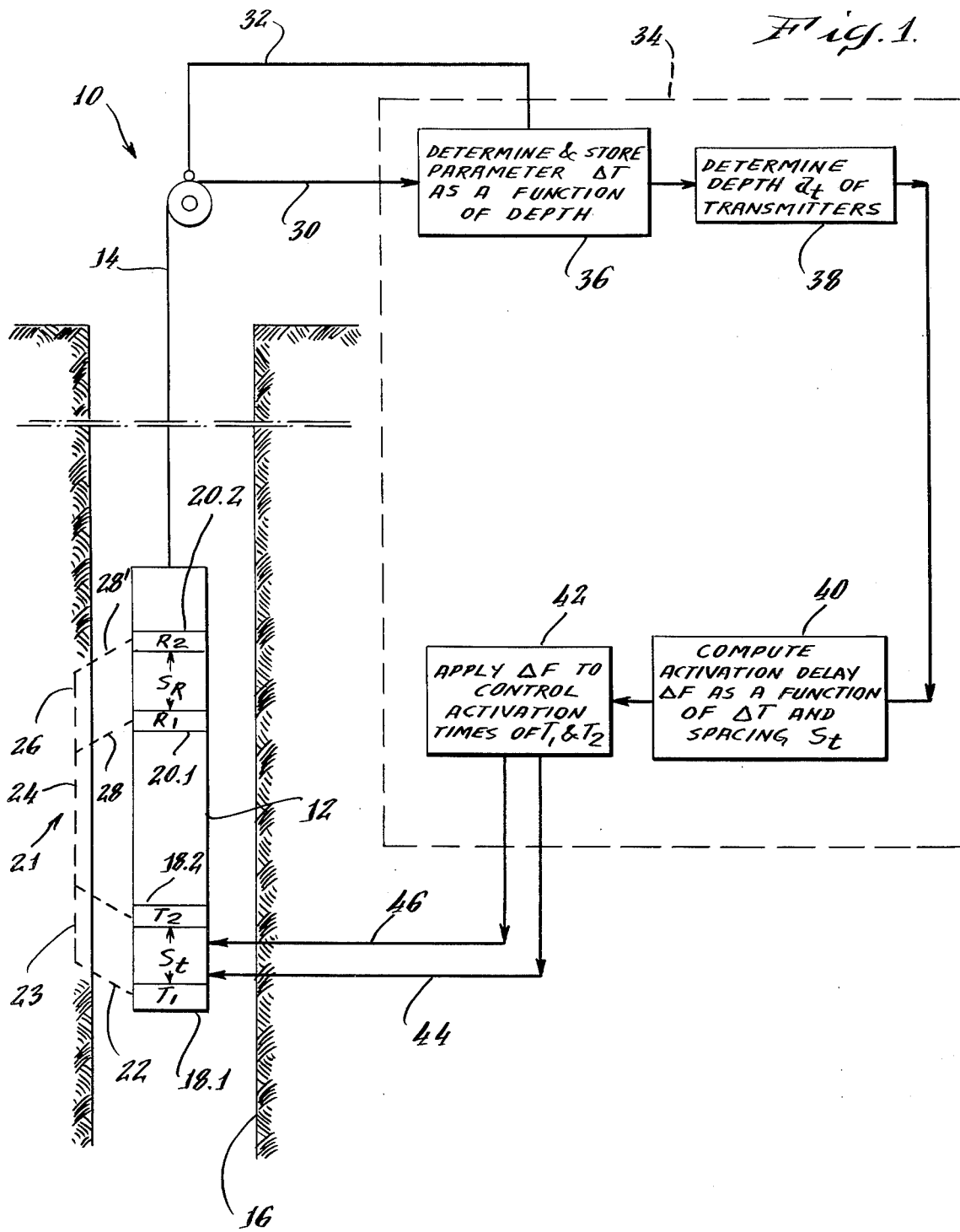
FIG. 1 is a schematic representation of an apparatus for dynamic steering in accordance with the invention.

With reference to FIG. 1, a well logging system 10 is shown in schematic form. A well logging tool 12 is suspended from a cable 14 in a borehole 16 and is provided with a pair of transmitters 18.1 and 18.2 and a pair of receivers 20.1 and 20.2. The transmitters are spaced from each other by a distance $S_t$ which is selected so that a delayed actuation of the transmitters can produce a steered beam in a manner well known in the art. Transmitters 18 and receivers 20 may be of various types such as either acoustic or electromagnetic. When the distance $S_t$ exceeds the wavelengths employed in an electromagnetic transmission, the relative phase between the transmissions is so selected to result in the desired directivity.

The well logging tool 12 may include such other devices commonly found in borehole investigations such as a caliper to measure the borehole diameter, power supplies to actuate the transmitters 18 and control circuits to obtain the desired variable delay in the actuating of the transmitters. Such devices are well known, and thus for clarity have been deleted from FIG. 1. Suffice it to point out that electrical power for the various tool functions is supplied through cable 14 from above ground sources (not shown) together with signal paths for control signals and waveforms from receivers 20.

In a typical well logging operation, the tool 12 is moved upwardly as the transmitters 18 are activated at a rate of the order of 20 pulses per second to direct pulses of energy towards the earth formation. The activated transmitters generate waves which travel to the receivers 20 along a path as generally indicated at 21 and formed of a segment 22 passing through the borehole medium near the transmitters 18, a formation segment 23 between transmitters 18, a common formation segment 24, a formation segment 26 between receivers 20.1 and 20.2 for energy incident upon receiver 20.2, and segments 28 and 28' between receivers 20.1 and 20.2 respectively and the wall of the borehole. The receivers 20 may be alternately enabled to produce received waves in response to transmitter activations.

In system 10, the received waves are amplified and transmitted up cable 14 to above ground signal processing equipment along a line 30 as is generally well known in the art. Depth signals are derived on line 32 by monitoring the length of cable 14 being paid out.

The received waves and depth signals are processed to derive useful information about the earth formation. As is well known in the art, a digital processor 34 may be employed for such processing by converting the well logging data to a compatible format. One technique for converting the well logging information may be as described in a copending patent application entitled "Method and Apparatus for Determining Acoustic Wave Parameters in Well Logging", filed on May 27, 1975 with Ser. No. 581,381 by the same inventor and assigned to the same assignee as for this application.

Several techniques are described in the copending patent application for deriving a useful parameter from the received waves. For example, the received waves may be rapidly converted to a digital format and subsequently employed in special processing techniques to yield a parameter such as velocity of the transmitted wave or in a sonic investigation the velocity of the compressional wave $V_c$ in feet/sec or its inverse, the travel time $\Delta T$, in microseconds per foot. Such parameter can be determined rapidly and reliably with processing techniques which are completed in the interval between successive transmitter firing cycles.

The parameter can be determined with a fixed programmed processor or one whose program can be altered to suit different conditions. Details for implementing such parameter determination can be obtained from the previously identified copending patent application.

The process 34 is programmed as shown in section 36 to determine a parameter wave signal such as $\Delta T$ (travel time) as a function of the depth of the tool 12 in such short time that the $\Delta T$ determination is completed at a rate compatible with conventional logging speeds. The depth data on line 32 is referenced to a particular place on tool 12 such as, for example, the location of the receiver 20.2 farthest from transmitters 18, or the location midway between receivers 20.

When the parameter $\Delta T$ is determined by processing different waves from receivers 20.1 and 20.2 respectively, the travel time for the borehole segment 26 between the receivers 20.1 and 20.2 is derived. Since this borehole segment is located ahead of the transmitters 18, the parameter value or wave signal is stored along with the depth of the borehole segment to which the measurement relates as indicated at section 36 of processor 34.

The process of activating the transmitters 18.1 and 18.2 is continued as tool 12 is moved up along the borehole 16. The actual depth of the transmitters 18 is monitored in section 38 of processor 34 since the distance between the receivers 20 and the transmitters 18 are known. When the transmitters 18 are operatively disposed with respect to a borehole segment such as 26, for which the parameter value $\Delta T$ has been previously determined and stored, that value is used to compute an activating delay $\Delta F$ between the transmitters with processor section 40.

The delay $\Delta F$ can be expressed as a phase delay measured in microseconds. Thus, for example, a short interval after the first transmitter 18.1 has been activated, the second transmitter 18.2 is activated. The delay $\Delta F$ can be dynamically determined on a number of bases.

In the embodiment illustrated in FIG. 1, the activation delay $\Delta F$ is determined as that needed to enhance the transmitted wave traveling at the measured $\Delta T$. Hence, $\Delta F$ is equal to the travel time parameter value $\Delta T$ with a correction factor to take into consideration the actual spacing $S_t$ between the transmitters. For example, if the parameter value $\Delta F$ is in microseconds per foot and the spacing $S_t$ is equal to 1 foot, the actual delay is equal to $\Delta T$. If the spacing is, say 6 inches, then the actual delay $\Delta F$ is divided by two in section 40.

Once the delay $\Delta F$ is computed as illustrated in section 40, it is used in a section 42 of processor 34 to control the relative activation of the transmitters. In a typical investigation, the transmitters 18 are activated at regular intervals. The activation can be controlled remotely from the above ground equipment by sending an appropriate pulse down cable 14. Suitable electronics located in the tool 12 may then be relied upon to provide the relative activation delay between the transmitters 18 together with a control signal, such as described in the aforementioned U.S. Pat. No. 3,614,725 to Moran to establish the desired activation delay $\Delta F$. In such case the activation control for the transmitters is partly located down hole and partly above ground with the section 42 providing, for example, the regularly recurring activating pulses on line 44. A digital to analog conversion of the activation delay signal $\Delta F$ from section 40 is then employed to continuously adjust the relative delay between the transmitter firings. Alternatively, the delay $\Delta F$ may be transmitted down hole from section 40 along cable 14 in digital format. In such case the tool 12 is provided with appropriate storage networks such as described in the aforementioned U.S. Pat. No. 3,732,945 to Lavigne to separately actuate transmitter 18.1 first, then followed by transmitter 18.2 with a delay of $\Delta F$.

The described activating delay control functions as a closed loop control system which permits a well logging operation to be conducted with the system performance updated as a function of actual formation conditions. As a closed loop control, the entire processing of the waves to derive the control parameter for control of the dynamic beam steering can be carried out down hole. Appropriate processing devices capable of operating in the borehole environment can be placed in the tool while digitized received waves are transmitted up cable 14 for recording in suitable storage devices such as tape recorders.

For certain earth formations it may be desirable to enhance different parameters. For example, in a sonic borehole investigation it may be preferable to dynamically beam steer for enhancement of the shear wave. In such case the parameter determined in section 36 can be the travel time for the shear wave $\Delta TS$ obtained in a manner as described in the aforementioned copending patent application. A delay $\Delta F$ in such case is computed as a function of shear wave travel time and corrected for the spacing $S_t$ while the value of $\Delta F$ related to the borehole segment to which the transmitters 18 have been operatively moved is used.

When, in a sonic borehole investigation, the shear wave is difficult to detect in the received waves, the travel time $\Delta TS$ for the shear wave may be estimated from a measurement of the compressional wave's travel time $\Delta TC$ as described in the previously identified copending patent application. For example, $\Delta TS$ is known to be greater than $\Delta TC$ by a factor which may vary from 1.6 to about 2.0. The actual factor employed in the estimate can be selected on the basis of a general knowledge of the lithology at the depth of interest.

Figure 2:
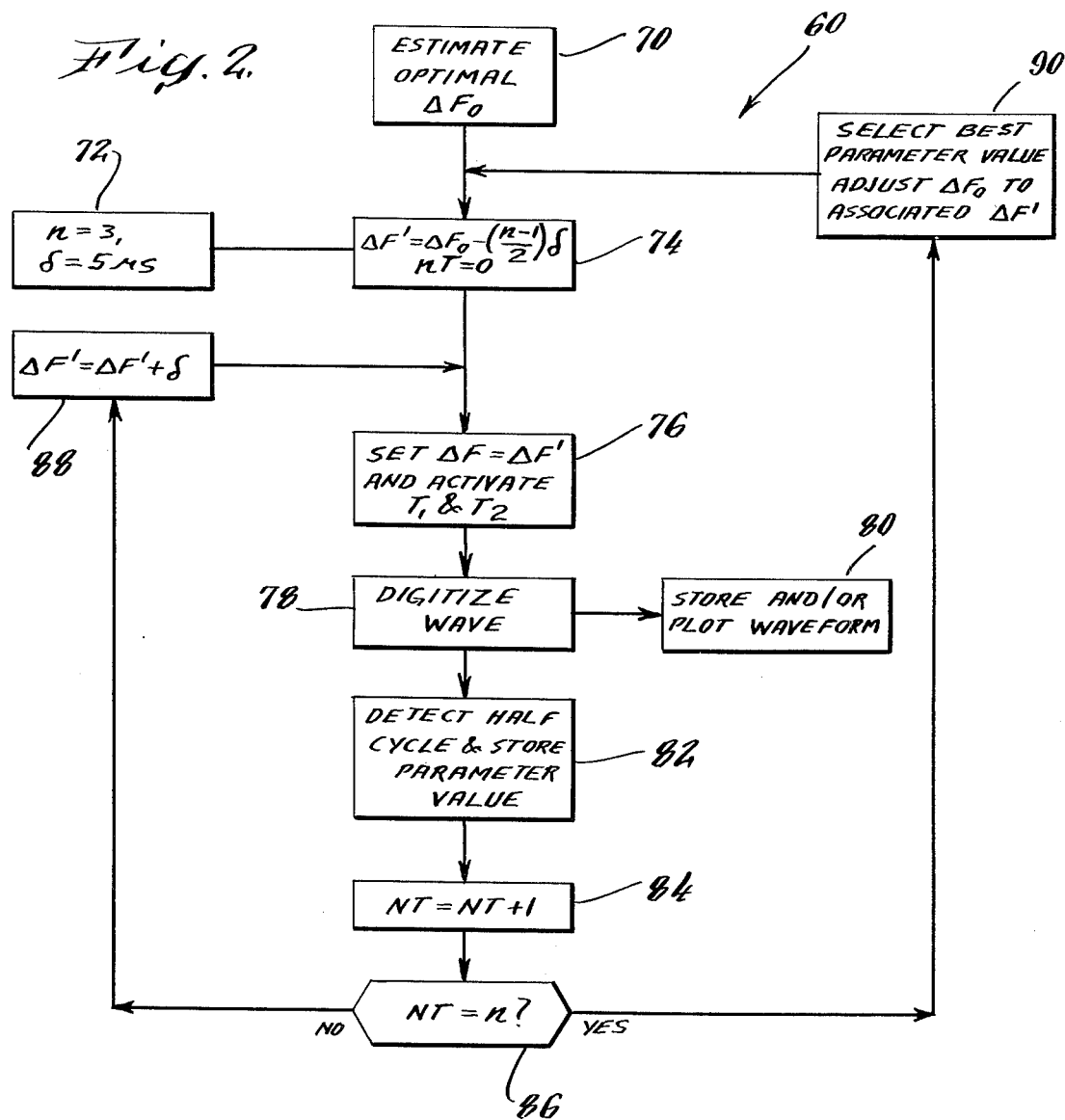
FIG. 2 is a schematic representation of a method for dynamically steering a beam of energy to preferentially enhance a particular wave segment from which a parameter is derived.

In the embodiment shown in FIG. 2 a technique 60 for dynamic beam steering of transmitters 18 to enhance a particular parameter of a segment of a received wave is shown. The technique 60 may be carried out with a single receiver 20 and with a processor such as 34 employing a fixed program or with a signal processor of the variable programming type. In the technique 60 the peak in a particular cycle of the received wave is optimized. In such case a single receiver tool may be used or one of the receivers 20 in tool 12 as shown in FIG. 1 is disabled. The technique 60 of FIG. 2 is illustrated in simplified form with steps or components such as digitizing of received waves, organization of data and detections of particular waves being deleted for clarity. Reference can be had to the aforementioned copending patent application for such information.

Figure 3:
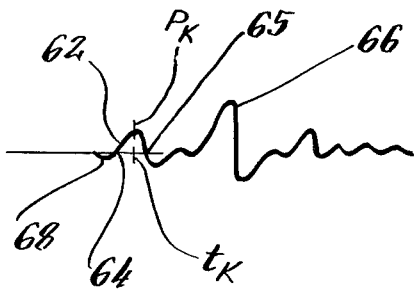
FIG. 3 is a waveform derived from a sonic receiver.

The embodiment illustrated in FIG. 2 contemplates the use of dynamic beam steering to maximize the magnitude of a predetermined segment of a received sonic wave such as the peak of the half cycle 62 following the first cross-over 64 in the waveform 66 illustrated in FIG. 3.

The technique of FIG. 2 may be commenced with a first activation of both transmitters with an initial trial activating delay $\Delta F_o$ based upon an estimate of the travel time for the compressional wave in waveform 66 of FIG. 3. For each actuation of the transmitters, the delay $\Delta F$ is varied in increments of $\delta$ around the trial value $\Delta F_o$ for a total of $n$ tries. For each try, a parameter such as the magnitude of the peak ($P_k$) in the half cycle 62 is measured and stored in association with the delay $\Delta F$ used to obtain values $P_k$. The best value of the parameter is selected, such as the maximum value for $P_k$ and the corresponding delay $\Delta F$ is then used as an optimum and new trial delay $\Delta F_o$ for the next series of tries.

In terms of the process steps illustrated in FIG. 2, an initial estimate, $\Delta F_o$, is provided as shown in block 70. Also, as shown in block 72, the values of $n$ and $\delta$ are provided. The value of $\delta$ is of the order of a few microseconds and generally is selected about $\frac{1}{8}$ to $\frac{1}{4}$ of the width of the half cycle 62. In the example of FIG. 2, $\delta = 5$ microseconds.

The value for $n$ is chosen as that whole integer number found useful for optimizing $\Delta F$. Generally, an odd numbered value, such as $n = 3$, for the above range of values for $\delta$ may be used.

As shown in block 74, a delay $\Delta F'$ is computed as a variation of $\Delta F_o$ depending upon the values of $n$ and $\delta$ and according to the relationship $\Delta F' = \Delta F_o - (n - 1/2)\delta$. Also, a trial counter, NT, is initialized here to the value 0.

In block 76 of FIG. 2, the delay $\Delta F'$ is used to control the delay between the actuations of two transmitters, $T_1$ and $T_2$, as shown at 18.1 and 18.2, respectively, in FIG. 1. The resulting acoustic wave arrives at receiver 20.1 and is transduced to an electrical form.

A processing technique as described in the previously identified copending patent application, may be used in block 78 to digitize the received wave for further processing such as plotting or analysis after storage in block 80. The digitized waveform 66 is then scanned in block 82 to identify the half cycle 62 and its peak energy, $P_k$, determined and stored. If desired, the arrival time $t_k$ of the peak value, $P_k$, in the half cycle may also be detected and stored. The value $t_k$ is determined with reference to the activating time of the transmitter 18.1, which is farthest away from the receiver 20.1.

The detection of the half cycle 62 may be carried out by initially detecting the first motion 68 and its arrival time in waveform 66 using one of the techniques described in the previously identified copending patent application. Once the arrival time of the first motion is known, the first cross-over 64 is detected by scanning the waveform 66 starting at the first motion 68. The entire half cycle may then be identified by detecting the second cross-over 65 so that all sampled values of the half-cycle 62 can then be examinined for the location and storage of the magnitude of the peak value $P_k$.

The previously discussed trial counter NT is then incremented as shown at 84 and tested at 86 for equality to $n$, the number of tries specified in block 72. Since, on the first try, NT will be less than $n$, the answer of test 86 will be NO and the process continues at block 88.

In block 88 the previous delay $\Delta F'$ is adjusted by the increment $\delta$ to provide a new value for $\Delta F'$ which is then used as described for blocks 76 through 86.

When $n$ tries have been completed NT = $n$ and the result of the test block 86 in YES. The process continues as shown in FIG. 2 to block 90 where the derived parameter values, such as $P_k$, for the "$n$" various $\Delta F'$ values are examined. The $\Delta F'$ for the best parameter value is selected and subsequently used in the previously described process as the optimal trial value, $\Delta F_o$, for the next series of firings by starting again at block 74.

FIG. 4 illustrates an analog technique 100 for deriving the peak value of the first half cycle 62 as a replacement for the blocks 78 and 82 shown in FIG. 2.

Thus, in block 78A an enabling signal is generated on a line 104 after both transmitters 18.1 and 18.2 have been activated as in block 76 in FIG. 2. The enabling signal may be produced after sensing the first cross-over 64 and is disabled after the second cross-over 65 is sensed.

The enabling signal is applied to an analog logic gate 106 to enable signals from a receiver on line 108 to be applied to a threshold detector 110. The latter's output 112 is coupled to an analog logic gate 114 to provide an enabling pulse with a duration equivalent to the time that the first half cycle exceeds a threshold value set to exclude spurious noise signals.

The half cycle signal is thus passed through analog gates 106 and 114 to a peak detector 116 to measure the peak value, $P_k$, of the half cycle 62. A network 118 is used to sense the end of the enabling pulse from threshold network 110 and produces a pulse representative thereof on line 120 to activate a sample and hold network 122.

After a delay by network 124 to enable the sampling by network 122, a convert command signal is applied on line 126 to an analog to digital (A/D) converter 128. The latter converts the sampled half cycle peak vlue, $P_k$, stored in network 122 to a digital format suitable as input to the signal processor along the input 130.

The signal processor receives the peak value at block 82A at such time as the peak value is available in accordance with a suitable instruction signal from A/D network 128. Subsequent steps by the signal processor are performed as previously described with respect to FIG. 2 by continuing with the step in block 84.

There has been illustrated a method and apparatus for enhancing the segment of a wave in a borehole investigation by controlling the directivity of the source of energy during the investigation as a function of a parameter derived from the enhanced segment. This technique may be utilized with different sources of energy such as acoustic or electromagnetic. The real-time control over the directivity of the energy beam enhances detection of the parameter and advantageously allows greater spacings of the receiver from the transmitters to improve a borehole investigation.

The above-described embodiments are intended to be exemplary and variations therefore may be contemplated without departing from the scope and spirit of the invention.

What is claimed is:

1. A method for investigating a borehole with a well logging tool having a plurality of transmitters for generating separate transmissions which may be variably and relatively delayed to provide a steerable energy beam and further having a receiver operatively located ahead of the transmitters to receive incident transmissions and generate a received wave representative of the borehole investigation comprising the steps of deriving a parameter from the received wave; and automatically varying the activating delay between the transmitters as a function of the derived parameter to dynamically steer the transmissions from said transmitters in a direction towards the receiver during the borehole investigation.

2. The method for investigating a borehole according to claim 1 wherein the deriving step further includes deriving a parameter of a wave in the received wave and related to a predetermined segment of the borehole; and wherein the varying step includes the step of varying the delay between the transmitters as a function of the derived parameter when the transmitters are operatively located with respect to the predetermined borehole segment to which the derived parameter relates.

3. The method for investigating a borehole according to claim 2 wherein the deriving step further includes storing parameter values relates to predetermined borehole segments; and applying the stored parameter values to vary the delay between the transmitters in the order with which the parameter values were derived to provide a dynamically steered energy beam from the transmitters.

4. The method for investigating a borehole according to claim 2 wherein the varying step further includes the step of adjusting the parameter value as a function of the spacing between the transmitters to provide an activating delay porportional to the parameter value.

5. The method for investigating a borehole according to claim 1 wherein the derived parameter is the travel time of a predetermined characteristic of the received wave.

6. The method for investigating a borehole according to claim 1 wherein the derived parameter is the magnitude of a predetermined segment of the received wave.

7. A method for investigating a borehole with an acoustic well logging tool having at least a pair of sonic transmitters and a sonic receiver located operatively ahead of the sonic transmitters to produce received waves representative of the acoustic investigation comprising the steps of deriving for successive segments of the borehole parameter values of a wave received from the receiver;

storing the parameter values as said tool is moved along said borehole; and varying the delay between respective sonic transmitter firings as a function of the stored parameter values when the sonic transmitters are operatively located with respect to the borehole segments to which the stored parameter values relate.

8. The method for investigating a borehole in accordance with claim 7 and including the step of adjusting the parameter values in accordance with the spacing between the sonic transmitters to provide transmitter firing delays between the transmitters selected to enhance the wave whose parameter value is derived.

9. The method for investigating a borehole in accordance with claim 8 wherein the deriving step further includes the steps of detecting a predetermined segment of the received wave;

measuring a characteristic parameter for the predetermined segment; and applying said measured parameter to vary the delay in a direction selected to enhance the predetermined segment with subsequent firings of the transmitters.

10. The method for investigating a borehole in accordance with claim 9 wherein the segment detecting step further includes detecting the first motion in the received wave; and detecting the first half cycle in the received wave following the first cross-over subsequent to said detected first motion.

11. The method for investigating a borehole in accordance with claim 10 wherein the characteristic parameter measuring step further includes scanning said half cycle to determine the magnitude of its peak value.

12. A method for investigating a borehole with a well logging tool having at least a pair of transmitters for generating a steerable beam of energy in response to relatively delayed activation of the transmitters and a receiver operatively located ahead of the transmitters to produce received waves representative of the borehole investigation comprising the steps of determining a delay for respective activation of the transmitters in accordance with a predetermined variation relative to a trail delay value;

activating the transmitters in accordance with the determined delay;

deriving a parameter value of a received wave from the receiver for the determined delay;

repeating said determining, activating and deriving steps for different delays determined in accordance with the predetermined variation;

selecting the best parameter value and associated delay from those parameter values derived for the different delays; and replacing the trial delay value with the delay value associated with the best parameter value for further investigation of the borehole with said tool.

13. The method for investigating a borehole in accordance with claim 12 wherein the parameter deriving step further includes the step of detecting a predetermined segment of the received wave; and measuring the peak value of said predetermined segment as the parameter value.

14. The method for investigating a borehole in accordance with claim 13 wherein said transmitters produce pulses of acoustic energy which said receiver responds to for generating said received wave, with said detecting step including the step of detecting a predetermined half cycle following the first motion of the received wave.

15. An apparatus for investigating a borehole with a well logging tool employing a plurality of transmitters located to enable variation of the directivity of the beam of energy from the transmitters by controlling the relative delay in activation of the transmitters with a receiver located to respond to incident transmitter generated energy for receiving a wave representative of the borehole investigation comprising means operative during the borehole investigation for producing a parameter signal representative of a characteristic of a received wave;

means responsive to the parameter signal for producing an activating delay signal which is a function of the parameter signal; and means for applying the activating delay signal to the transmitters to direct the beam of energy therefrom during the borehole investigation in a direction selected to optimize said received wave characteristic from which the parameter signal is produced.

16. The apparatus for investigating a borehole in accordance with claim 15 wherein the parameter signal producing means further includes means for storing the parameter signals; and means for selecting the stored parameter signal for control over the directivity of the energy beam from the transmitters in accordance with the borehole segment to which the transmitters have been moved during the borehole investigation.

17. The apparatus for investigating a borehole in accordance with claim 16 wherein the activating delay signal producing means further includes means for adjusting the activating delay signal for the spacing between the transmitters.

18. An apparatus for investigating a borehole with a well logging tool located in the borehole for movement in a logging direction comprising a well logging tool having a plurality of transmitters selectively spaced from each other to enable generation of a beam of energy with a controllable directivity and a receiver to produce a received wave in response to incident energy, said receiver being located ahead of the transmitters as measured along the logging direction;

means responsive to the received wave for producing a parameter signal representative of a characteristic of a received wave;

means responsive to the parameter signal for generating an activating delay signal representative of a desired direction of the beam of energy; and means for applying said activating delay signal to activate the transmitters for real time direction control of the beam of energy produced therefrom.

19. The apparatus for investigating a borehole in accordance with claim 18 wherein said activating delay signal generating means further includes means for adjusting the parameter signal as a function of the spacing between the transmitters.

20. The apparatus for investigating a borehole in accordance with claim 18 wherein the parameter signal generating means further includes means for deriving a segment signal representative of a predetermined characteristic of a selected segment of the received wave generated with a trial delay for activating the transmitters; and wherein the activating delay signal generating means further includes i. means for producing a plurality of activating delay signals representative of delayed activations of the transmitters about the trial delay value;

ii. means for storing the segment signals and their associated activating delay signals; and iii. means for selecting the delay signal associated with the best segment signal as a new trial delay.

21. The apparatus for investigating a borehole in accordance with claim 20 wherein the means for deriving the segment signal derives the peak value of said selected segment.

22. The apparatus for investigating a borehole in accordance with claim 20 wherein the means for deriving the segment signal derives the velocity of said selected segment.

23. An apparatus for investigating a borehole with a well logging tool located in the borehole for movement in a well logging direction comprising a well logging tool having a plurality of acoustic pulse producing transmitters selectively spaced from each other to control directivity of transmitter produced sonic energy by varying the firing delay between the transmitters, said tool further having a pair of sonic receivers each of which produces a received wave in response to incident acoustic energy, said receivers being located ahead of the transmitters s measured along the logging direction;

means responsive to the received waves from the receivers for deriving parameter signals representative of a characteristic of a received wave and related to successive borehole segments;

means for storing said parameter signals;

means for producing relatively delayed firing signals for said transmitters as a function of the stored parameter signals and related to the borehole segment with respect to which the sonic transmitters are being operatively moved.

24. The apparatus for investigating a borehole according to claim 23 wherein the parameter signal deriving means further includes means for generating wave signals representative of the velocities of a predetermined wave in the received waves as the parameter signals.

25. The apparatus for investigating a borehole according to claim 24 wherein said delayed firing signal producing means further includes means for correcting the wave signals as a function of the spacing between the transmitters.

* * * * *

UNITED STATES PATENT AND TRADEMARK OFFICE
CERTIFICATE OF CORRECTION

PATENT NO. : 4,123,744
DATED : October 31, 1978
INVENTOR(S) : John D. Ingram

It is certified that error appears in the above-identified patent and that said Letters Patent are hereby corrected as shown below:

Abstract, line 15 - "borehold" should be --borehole--.

Col. 2, line 46 - "variation" should be --variations--.

Col. 3, line 4 - "means" should be --mean--.

Col. 3, line 48 - after "parameter" delete ",".

Col. 7, line 40 - "$\Delta F = \Delta F_o - (n - 1/2)$" should be $--\Delta F' = \Delta F_o - \frac{(n - 1)}{2}--$.

Col. 8, line 9 - "NT-n" should be --NT=n--.

Col. 8, line 44 - "vlue" should be --value--.

Col. 8, line 65 - "therefore" should be --therefrom--.

Col. 9, line 28 - "relates" should be --related--.

Col. 10, line 35 - "trail" should be --trial--.

Col. 12, line 34 - "s" should be --as--.

Signed and Sealed this

Tenth Day of April 1979

[SEAL]

Attest:

RUTH C. MASON
Attesting Officer

DONALD W. BANNER
Commissioner of Patents and Trademarks